(12) United States Patent
Guo et al.

(10) Patent No.: US 11,928,282 B2
(45) Date of Patent: Mar. 12, 2024

(54) TOUCH PANEL DRIVING METHOD AND APPARATUS, AND TOUCH DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Rui Guo, Beijing (CN); Lihui Han, Beijing (CN); Junning Su, Beijing (CN); Zhanchang Bu, Beijing (CN); Hetao Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 52 days.

(21) Appl. No.: 17/642,848

(22) PCT Filed: May 18, 2021

(86) PCT No.: PCT/CN2021/094414
§ 371 (c)(1),
(2) Date: Mar. 14, 2022

(87) PCT Pub. No.: WO2021/244280
PCT Pub. Date: Dec. 9, 2021

(65) Prior Publication Data
US 2022/0374126 A1 Nov. 24, 2022

(30) Foreign Application Priority Data
Jun. 3, 2020 (CN) .......................... 202010494994.2

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC .............. G06F 3/04166; G06F 3/0446; G06F 3/04164; G06F 3/0412; G06F 3/044
See application file for complete search history.

(56) References Cited

U.S. PATENT DOCUMENTS 8,860,691 B2 * 10/2014 Hong .................. G06F 3/04166
345/174
9,007,342 B2 * 4/2015 Grivna .................. G06F 1/3262
345/173

(Continued)

FOREIGN PATENT DOCUMENTS

CN 103257740 A 8/2013
CN 103336592 A 10/2013

(Continued)

*Primary Examiner* — Amy Onyekaba
(74) *Attorney, Agent, or Firm* — WHDA, LLP

(57) ABSTRACT

The driving method includes: inputting a first scanning signal to each of the first touch electrodes at a same time, and receiving a first sensing signal of each of the second touch electrodes to determine a suspected column according to the first sensing signal; inputting a second scanning signal to each of the second touch electrodes at a same time, and receiving a second sensing signal of each of the first touch electrodes to determine a suspected row according to the second sensing signal; determining a suspected touch region according to the suspected column and the suspected row; and sequentially inputting a third scanning signal row by row to each of the first touch electrodes in the suspected touch region, and receiving a third sensing signal of each of the second touch electrodes in the suspected touch region to determine a touch position according to the third sensing signal.

12 Claims, 6 Drawing Sheets

(56) References Cited

U.S. PATENT DOCUMENTS

| | | | | |
|---|---|---|---|---|
| 9,886,133 | B2* | 2/2018 | Zhao | G06F 3/0412 |
| 2011/0025629 | A1* | 2/2011 | Grivna | G06F 3/041662 |
| | | | | 345/173 |
| 2011/0227863 | A1* | 9/2011 | Cheng | G06F 3/0445 |
| | | | | 345/174 |
| 2012/0050216 | A1* | 3/2012 | Kremin | G06F 3/0446 |
| | | | | 345/174 |
| 2012/0056842 | A1* | 3/2012 | Chang | G06F 3/0446 |
| | | | | 345/174 |
| 2012/0154324 | A1* | 6/2012 | Wright | G06F 3/041661 |
| | | | | 345/174 |
| 2013/0100071 | A1* | 4/2013 | Wright | G06F 3/04166 |
| | | | | 345/173 |
| 2013/0215049 | A1* | 8/2013 | Lee | G06F 3/041 |
| | | | | 345/173 |
| 2014/0176483 | A1* | 6/2014 | Lee | G06F 3/0446 |
| | | | | 345/174 |
| 2015/0075959 | A1* | 3/2015 | Lu | G06F 3/0445 |
| | | | | 200/5 R |
| 2016/0162101 | A1* | 6/2016 | Pant | G06F 3/04162 |
| | | | | 345/174 |
| 2016/0349919 | A1* | 12/2016 | Chang | G06F 3/04184 |
| 2017/0115820 | A1* | 4/2017 | Zhao | G06F 3/04166 |
| 2018/0004326 | A1* | 1/2018 | Kim | G06F 3/0446 |
| 2019/0079613 | A1* | 3/2019 | Zhang | H04M 1/0266 |
| 2019/0212867 | A1* | 7/2019 | Han | G06F 1/3265 |
| 2019/0294291 | A1 | 9/2019 | Jia | |
| 2020/0033979 | A1* | 1/2020 | Sauer | G06F 3/04166 |
| 2020/0064969 | A1* | 2/2020 | Gao | G06F 3/0443 |
| 2020/0103993 | A1* | 4/2020 | Krah | G06F 3/04182 |

FOREIGN PATENT DOCUMENTS

| | | |
|---|---|---|
| CN | 108459772 A | 8/2018 |
| CN | 109857275 A | 6/2019 |

* cited by examiner

TOUCH PANEL DRIVING METHOD AND APPARATUS, AND TOUCH DISPLAY DEVICE

CROSS REFERENCE TO RELEVANT APPLICATIONS

The present disclosure claims the priority of the Chinese patent application filed on Jun. 3, 2020 before the Chinese Patent Office with the application number of 202010494994.2 and the title of "TOUCH PANEL DRIVING METHOD AND APPARATUS, AND TOUCH DISPLAY DEVICE", which are incorporated herein in its entirety by reference.

TECHNICAL FIELD

The present disclosure relates to the technical field of displaying, and in particularly relates to a touch panel driving method, an apparatus, and a touch display device.

BACKGROUND

With the continuous development of display technology, touch display technology has also received extensive attention. Since the pure flat display and active pen pressure display can be achieved, capacitance touch is considered to be the mainstream trend of the future touch.

At present, in order to prevent the false touch caused by environmental noise interference, the driving mode of the touch panel usually needs to scan three frames of the touch panel to determine the touch position. Specifically, when scanning each frame of the touch panel, it is necessary to provide scanning signals to each touch driving electrode row by row, and the suspected touch position is determined according to the sensing signals of the touch sensing electrodes. Then, the final touch position is determined according to the suspected touch position obtained by scanning three frames.

SUMMARY

The present disclosure provides a touch panel driving method, an apparatus, and a touch display device.

The present disclosure discloses a touch panel driving method, wherein, the touch panel comprises a plurality of first touch electrodes distributed along a row direction and a plurality of second touch electrodes distributed along a column direction, and the method comprises:
  inputting a first scanning signal to each of the first touch electrodes at a same time, and receiving a first sensing signal of each of the second touch electrodes to determine a suspected column according to the first sensing signal;
  inputting a second scanning signal to each of the second touch electrodes at a same time, and receiving a second sensing signal of each of the first touch electrodes to determine a suspected row according to the second sensing signal;
  determining a suspected touch region according to the suspected column and the suspected row; and
  sequentially inputting a third scanning signal row by row to each of the first touch electrodes in the suspected touch region, and receiving a third sensing signal of each of the second touch electrodes in the suspected touch region to determine a touch position according to the third sensing signal.

Optionally, when the suspected row and the suspected column are both one, the step of determining the suspected touch region according to the suspected column and the suspected row comprises:
  adding a first preset value to a row number where the suspected row is located to obtain a first target row number;
  subtracting a second preset value from a row number where the suspected row is located to obtain a second target row number;
  adding a third preset value to a column number where the suspected column is located to obtain a first target column number;
  subtracting a fourth preset value from a column number where the suspected column is located to obtain a second target column number; and
  determining a region surrounded by the first target row number, the second target row number, the first target column number and the second target column number as the suspected touch region.

Optionally, when the suspected row and the suspected column are both multiple, the step of determining the suspected touch region according to the suspected column and the suspected row comprises:
  determining a maximum value and a minimum value of row numbers where a plurality of suspected rows are located as a maximum suspected row number and a minimum suspected row number, respectively;
  determining a maximum value and a minimum value of column numbers where a plurality of suspected columns are located as a maximum suspected column number and a minimum suspected column number, respectively;
  adding a first preset value to the maximum suspected row number to obtain a first target row number;
  subtracting a second preset value from the minimum suspected row number to obtain a second target row number;
  adding a third preset value to the maximum suspected column number to obtain a first target column number;
  subtracting a fourth preset value from the minimum suspected column number to obtain a second target column number; and
  determining a region surrounded by the first target row number, the second target row number, the first target column number and the second target column number as the suspected touch region.

Optionally, the step of inputting the first scanning signal to each of the first touch electrodes at a same time, and receiving the first sensing signal of each of the second touch electrodes to determine the suspected column according to the first sensing signal comprises:
  inputting continuous K first scanning signals to each of the first touch electrodes at a same time, and receiving K first sensing signals of each of the second touch electrodes;
  converting the K first sensing signals to K first capacitance data;
  for each of the second touch electrodes, if it is detected that at least S first capacitance data in the K first capacitance data are greater than or equal to a first set threshold, determining the position of the second touch electrode to be the suspected column;
  wherein, K is greater than or equal to S, and S is a positive integer greater than 1.

Optionally, the step of inputting the second scanning signal to each of the second touch electrodes at a same time, and receiving the second sensing signal of each of the first touch electrodes to determine the suspected row according to the second sensing signal comprises:

inputting continuous K second scanning signals to each of the second touch electrodes at a same time, and receiving the K second sensing signals of each of the first touch electrodes;

converting the K second sensing signals to K second capacitance data;

for each of the first touch electrodes, if it is detected that at least S second capacitance data in the K second capacitance data are greater than or equal to a second set threshold, determining the position of the second touch electrode to be the suspected row;

wherein, K is greater than or equal to S, and S is a positive integer greater than 1.

Optionally, the first touch electrode is a touch driving electrode, and the second touch electrode is a touch sensing electrode.

Optionally, the first scanning signal, the second scanning signal and the third scanning signal are square wave signals or sine wave signals.

The present disclosure further discloses a touch panel driving apparatus, the touch panel comprises a plurality of first touch electrodes distributed along a row direction and a plurality of second touch electrodes distributed along a column direction, and the apparatus comprises:

a suspected column determination module configured for inputting a first scanning signal to each of the first touch electrodes at a same time, and receiving a first sensing signal of each of the second touch electrodes to determine a suspected column according to the first sensing signal;

a suspected row determination module configured for inputting a second scanning signal to each of the second touch electrodes at a same time, and receiving a second sensing signal of each of the first touch electrodes to determine a suspected row according to the second sensing signal;

a suspected touch region determination module configured for determining a suspected touch region according to the suspected column and the suspected row; and a touch position determination module configured for sequentially inputting a third scanning signal row by row to each of the first touch electrodes in the suspected touch region, and receiving a third sensing signal of each of the second touch electrodes in the suspected touch region to determine a touch position according to the third sensing signal.

Optionally when the suspected row and the suspected column are both one, the suspected touch region determination module comprises:

a row number first calculation sub-module configured for adding a first preset value to a row number where the suspected row is located to obtain a first target row number;

a row number second calculation sub-module configured for subtracting a second preset value from a row number where the suspected row is located to obtain a second target row number;

a column number first calculation sub-module configured for adding a third preset value to a column number where the suspected column is located to obtain a first target column number;

a column number second calculation sub-module configured for subtracting a fourth preset value from a column number where the suspected column is located to obtain a second target column number; and a suspected touch region first determination sub-module configured for determining a region surrounded by the first target row number, the second target row number, the first target column number and the second target column number as the suspected touch region.

Optionally, when the suspected row and the suspected column are both multiple, the suspected touch region determination module comprises:

a suspected row number determination sub-module configured for determining a maximum value and a minimum value of row numbers where a plurality of suspected rows are located as a maximum suspected row number and a minimum suspected row number, respectively;

a suspected column number determination sub-module configured for determining a maximum value and a minimum value of column numbers where a plurality of suspected columns are located as a maximum suspected column number and a minimum suspected column number, respectively;

a row number third calculation sub-module configured for adding a first preset value to the maximum suspected row number to obtain a first target row number;

a row number fourth calculation sub-module configured for subtracting a second preset value from the minimum suspected row number to obtain a second target row number;

a column number third calculation sub-module configured for adding a third preset value to the maximum suspected column number to obtain a first target column number;

a column number fourth calculation sub-module configured for subtracting a fourth preset value from the minimum suspected column number to obtain a second target column number; and a suspected touch region second determination sub-module configured for determining a region surrounded by the first target row number, the second target row number, the first target column number and the second target column number as the suspected touch region.

Optionally, the suspected column determination module comprises:

a first sensing signal receiving sub-module configured for inputting continuous K first scanning signals to each of the first touch electrodes at a same time, and receiving K first sensing signals of each of the second touch electrodes;

a first capacitance data converting module configured for converting the K first sensing signals to K first capacitance data;

a suspected column determination sub-module configured for, for each of the second touch electrodes, if it is detected that at least S first capacitance data in the K first capacitance data are greater than or equal to a first set threshold, determining the position of the second touch electrode to be the suspected column;

wherein, K is greater than or equal to S, and S is a positive integer greater than 1.

Optionally, the suspected row determination module comprises:

a second sensing signal receiving sub-module configured for inputting continuous K second scanning signals to each of the second touch electrodes at a same time, and receiving K second sensing signals of each of the first touch electrodes;

a second capacitance data converting sub-module configured for converting the K second sensing signals to K second capacitance data;

a suspected row determination sub-module configured for, for each of the first touch electrodes, if it is detected that at least S second capacitance data in the K second capacitance data are greater than or equal to a second set threshold, determining the position of the second touch electrode to be the suspected row;

wherein, K is greater than or equal to S, and S is a positive integer greater than 1.

The present disclosure further discloses a touch display device, wherein the touch display device comprises a touch panel and the touch panel driving apparatus described above.

Optionally, the touch panel driving apparatus is a touch driving chip; and the touch display device further comprises: a system board connected to the touch driving chip, a timer control register connected to the system board, a source driving chip and a grid driving chip connected to the timer control register, and a display panel connected to the source driving chip and the grid driving chip.

The present disclosure further discloses a computing and processing device, wherein the computing and processing device comprises:

a memory, wherein the memory stores a computer readable code; and one or more processors, when the computer readable code is executed by one or more processors, the computing and processing device executes the touch panel driving method described above.

The present disclosure further discloses a computer program, wherein the computer program comprises a computer-readable code, and when the computer-readable code is executed on a computing and processing device, the computing and processing device executes the touch panel driving method described above.

The present disclosure further discloses a computer-readable medium, wherein the computer-readable medium stores the computer program described above.

The above description is merely a summary of the technical solutions of the present disclosure. In order to more clearly know the elements of the present disclosure to enable the implementation according to the contents of the description, and in order to make the above and other purposes, features, and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art can obtain other figures according to these figures without paying creative work. It should be noted that the ratios in the drawings are merely illustrative and do not represent actual ratios.

DETAILED DESCRIPTION OF THE EMBODIMENTS

In order to make the objects, the features, and the advantages of the embodiments of the present disclosure clearer, the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
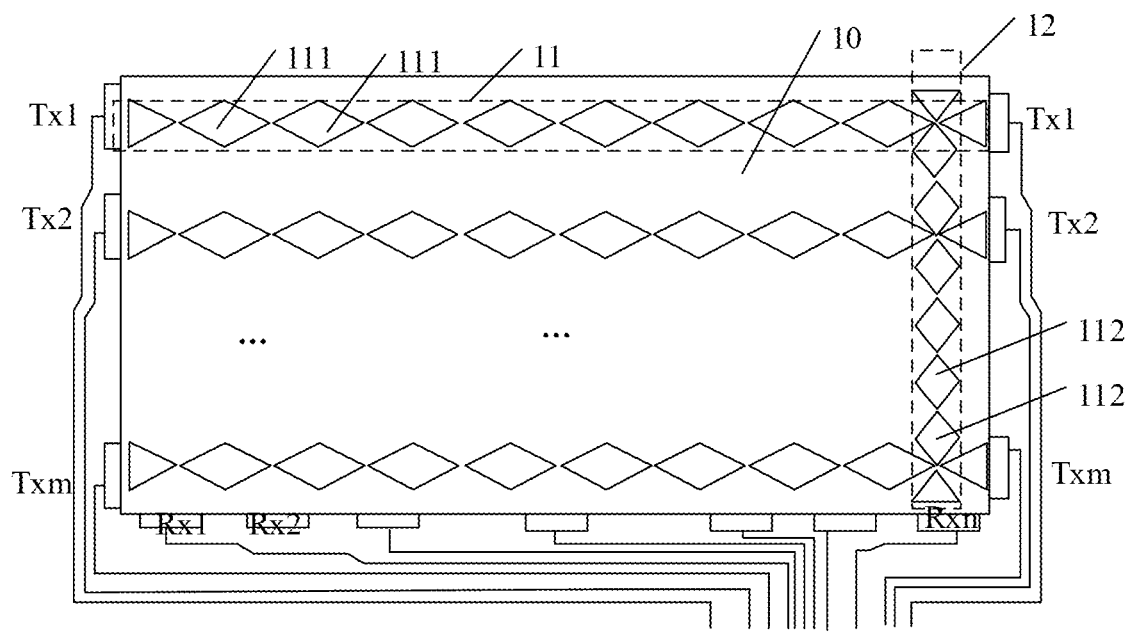
FIG. 1 illustrates a structural schematic diagram of a touch panel of the related art.

Referring to the FIG. 1, illustrating a structural schematic diagram of a touch panel of the related art.

As shown in the FIG. 1, a touch panel 10 includes m touch driving electrodes 11 distributed along a row direction and n touch sensing electrodes 12 distributed along a column direction, m and n are positive integers greater than 1. Each of the touch driving electrodes 11 includes a plurality of touch driving sub-electrodes 111 distributed along the row direction. Each of the touch sensing electrodes 12 includes a plurality of touch sensing sub-electrodes 112 distributed along the column direction. And each of the touch driving electrodes 11 is connected to 2 first touch electrode wirings, for example the left side and the right side of the first touch driving electrode 11 are connected to one first touch electrode wiring Tx1, the left side and the right side of the second touch driving electrode 11 are also connected to one first touch electrode wiring Tx2, and so on, the left side and the right side of the $m^{th}$ touch driving electrode 11 are also connected to one first touch electrode wiring Txm; and two first touch electrode wirings connected to each of the touch driving electrode 11 are connected together. Each of the touch sensing electrodes 12 is connected to one second touch electrode wiring, for example the first touch sensing electrode 12 is connected to one second touch electrode wiring Rx1, the second touch sensing electrode 12 is connected to one second touch electrode wiring Rx2, and so on, the $n^{th}$ touch sensing electrode 12 is connected to one second touch electrode wiring Rxn.

Taking that the touch panel 10 is a touch panel of 75 GG as an example, the specific reasons for the longer touch response time of the current touch panel driving method are explained. Wherein, the size of the touch panel of 75 GG is 75 inch, the GG touch panel is an external touch panel, which adds a layer of cover glass on one glass solution (OGS). OGS refers to the technology of directly forming indium tin oxide (ITO) conductive film and sensor on the protective glass.

For the touch panel of 75 GG, the number of the touch driving electrodes 11 distributed along the row direction is 126. That is, the number of the Tx channels and the number of the first touch electrode wirings on each side are both 126. The number of the touch sensing electrodes 12 distributed along the column direction is 228, that is, the number of the Rx channels and the number of the second touch electrode wirings are both 228. A resistance R1 of the touch driving electrode 11 is 14 KΩ. A resistance R2 of the touch sensing electrode 12 is 16 KΩ. A crossover capacitance C of the touch driving electrode 11 and the touch sensing electrode 12 is 600 pF.

When each frame of the touch panel 10 is scanned, the scanning signals are provided to each of the touch driving electrodes 11 row by row. When the scanning signals are provided to each of the touch driving electrodes 11, the scanning signals are provided to the corresponding connected touch driving electrode 11 at a same time, through the first touch electrode wiring on the left side and the first touch electrode wiring on the right side, then, the sensing signals of each of the touch sensing electrodes 12 are received to determine a suspected touch position. In addition, when the scanning signals are provided to each of the touch driving electrodes 11, three consecutive scanning signals are sent.

Figure 2:
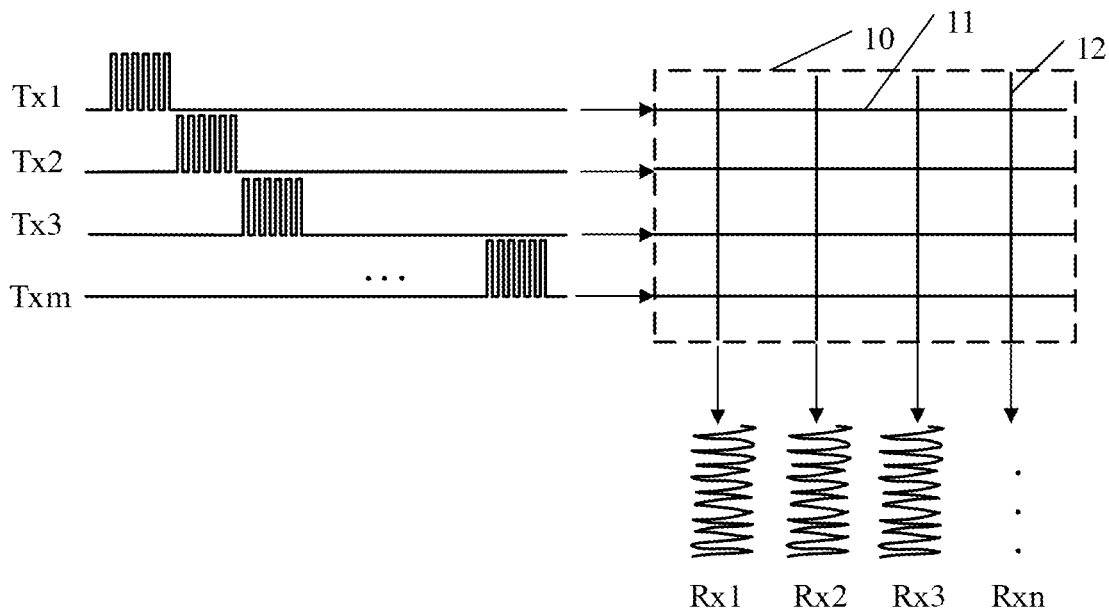
FIG. 2 illustrates a schematic diagram of a touch panel driving method of the related art.

As shown in the FIG. 2, the scanning signals are provided to the first touch driving electrode 11 through the first touch electrode wiring Tx1 connected to the left side and the right side of the first touch driving electrode 11. The sensing signals of each of the touch sensing electrodes 12 are received to determine the suspected touch position through the corresponding connected second touch electrode wiring (such as the second touch electrode wiring Rx1, the second touch electrode wiring Rx2, the second touch electrode wiring Rx3 to the second touch electrode wiring Rxn). Subsequently, the scanning signals are provided to the second touch driving electrode 11 through the first touch electrode wiring Tx2 connected to the left side and the right side of the second touch driving electrode 11. The sensing signals of each of the touch sensing electrodes 12 are received to determine the suspected touch position. Then the scanning signals are provided to the third touch driving electrode 11 through the first touch electrode wiring Tx3 connected to the left side and the right side of the third touch driving electrode 11. The sensing signals of each of the touch sensing electrodes 12 are received to determine the suspected touch position. And so on, the scanning signals are provided to the $m^{th}$ touch driving electrodes 11 through the first touch electrode wiring Txm connected to the left side and the right side of the $m^{th}$ touch driving electrode 11. The sensing signals of each of the touch sensing electrodes 12 are received to determine the suspected touch position.

In practical application, the time of scanning a complete frame of the touch panel is: Tx channel number×Tx scanning signal cycle×sampling frequency×(Rx channel number/AFE number). On the one hand, the role of an analog front end (AFE) is to send the scanning signals to the first touch electrode wiring. On the other hand, the role of an analog front end (AFE) is to receive the sensing signals of the second touch electrode wiring. The sensing signals are converted to digital signals representing a capacitance size through the analog to digital converter (ADC) set in AFE to determine the suspected touch position according to the digital signals representing the capacitance size. The number of AFE and the number of ADC in AFE are one-to-one correspondence. For the touch panel of 75 GG, the corresponding number of AFE and the corresponding number of ADC in AFE are 114, and the number of Rx channels is 228. That is, the number of AFE is not one-to-one corresponding to the number of Rx channels, AFE needs time-sharing multiplexing.

Figure 3:
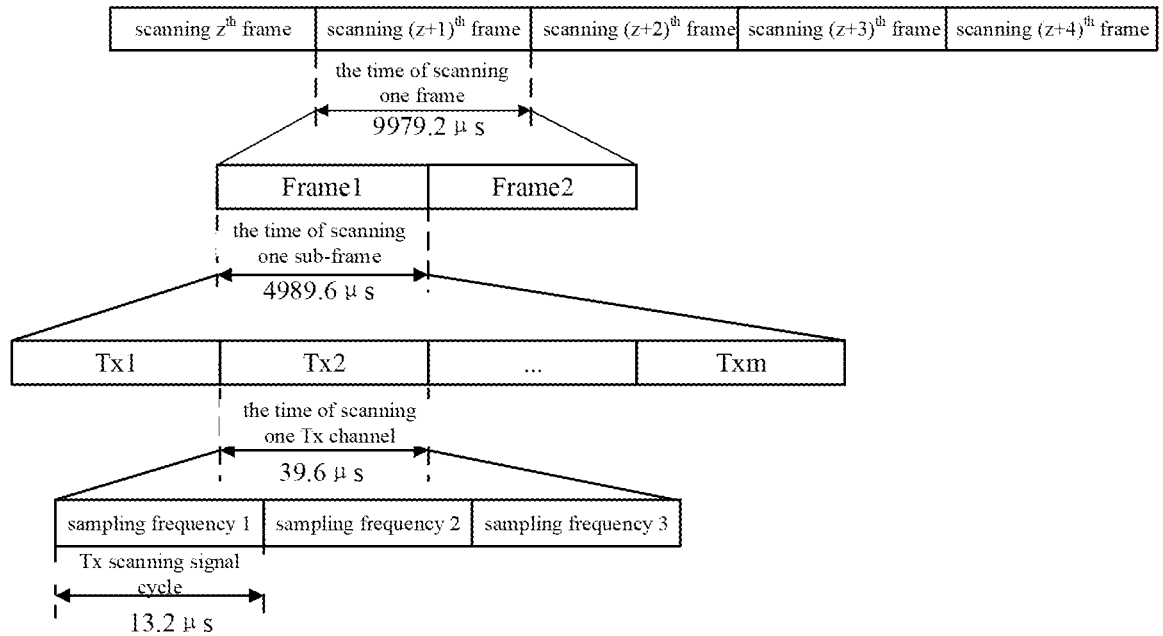
FIG. 3 illustrates a schematic diagram of a calculation process of the time required to detect once touch position corresponding to the touch panel driving method of the related art.

As shown in the FIG. 3, Tx scanning signal cycle=2.2× RC×2.86=2.2×(14×600/4)×2.86=13.2 μs. When the scanning signals are provided to each of the touch driving electrodes 11, the scanning signals are provided through the left first touch electrode wirings and the right first touch electrode wirings at a same time (i.e. bilateral drive), and the resistance R1 of each of the touch driving electrodes 11 is 14 KΩ. Therefore, when the bilateral drive is performed, it is equivalent to that two resistors are in parallel, and the resistance value of each of the resistors is R1/2, the resistance value of the final resistor is R1/4. The constant is 2.2 due to the charge of the capacitor is related to RC, and usually, being charged to 2.2×RC can be basically charged to 90% of the target value. Constant 2.86 is a practical experience value. Tx signals are a series of square wave signals, when each of the touch driving electrodes 11 is scanned, the capacitor is charging when the Tx signal is a high level, and the capacitor is discharging when the Tx signal is a low level. The charging time is 2.2×RC. Considering that the completely discharge is convenient for the next charging, the period of Tx scanning signal (that is, the time of one square wave signal, including the time of the high level and the time of the low level) is basically 2.2×RC× 2.86.

When the scanning signals are actually provided to each of the touch driving electrodes 11, three consecutive scanning signals are sent, that is, three times of sampling, such as a sampling frequency 1, a sampling frequency 2 and a sampling frequency 3 as shown in the FIG. 3, the time of scanning one Tx channel is: Tx scanning signal cycle× sampling frequency, that is, 13.2 μs×3=39.6 μs.

Since the number of the AFE is 114 and the number of the Rx channels is 228, it is necessary to divide one frame touch panel into two sub-frames, the first sub-frame only scans the results of Rx1 to Rx114, and the second sub-frame scans the results of Rx115 to Rx228. When each of the sub-frames is scanned, it is necessary to scan all rows of the touch driving electrodes 11 row by row, and all of the touch sensing electrodes 12 receive synchronously. The time of scanning one sub-frame is: the time of scanning one Tx channel×the number of the Tx channels, that is, 39.6 μs×126=4989.6 μs. Accordingly, the time of scanning one frame of the touch panel is: the time of scanning one sub-frame×(the number of the Rx channels/the number of the AFE), that is, 4989.6 μs×(228/114)=9979.2 μs.

In practical applications, in order to prevent the false touch operation caused by an interference detection of the environmental noise, it is necessary to scan three frames of the touch panel to determine the finally touch position. And the time required to detect the touch position is: the time of scanning one frame of the touch panel×3, that is, 9979.2 μs×3=29937.6 μs.

In summary, for the touch panel of 75 GG, at present, the time required of the method of determining the touch position by scanning three frames row by row to detect the touch position is 29937.6 μs. That is, the touch response time is 29937.6 μs. The touch response time is longer, which leads to the longer of the whole machine response time of the touch display device and cannot realize the effect of real-time display.

In order to shorten the touch response time, some embodiments of the present disclosure provide a new touch panel driving method, to shorten the touch response time, and further shorten the whole machine response time of the touch display device, and the effect of real-time display may be realized.

Figure 4:
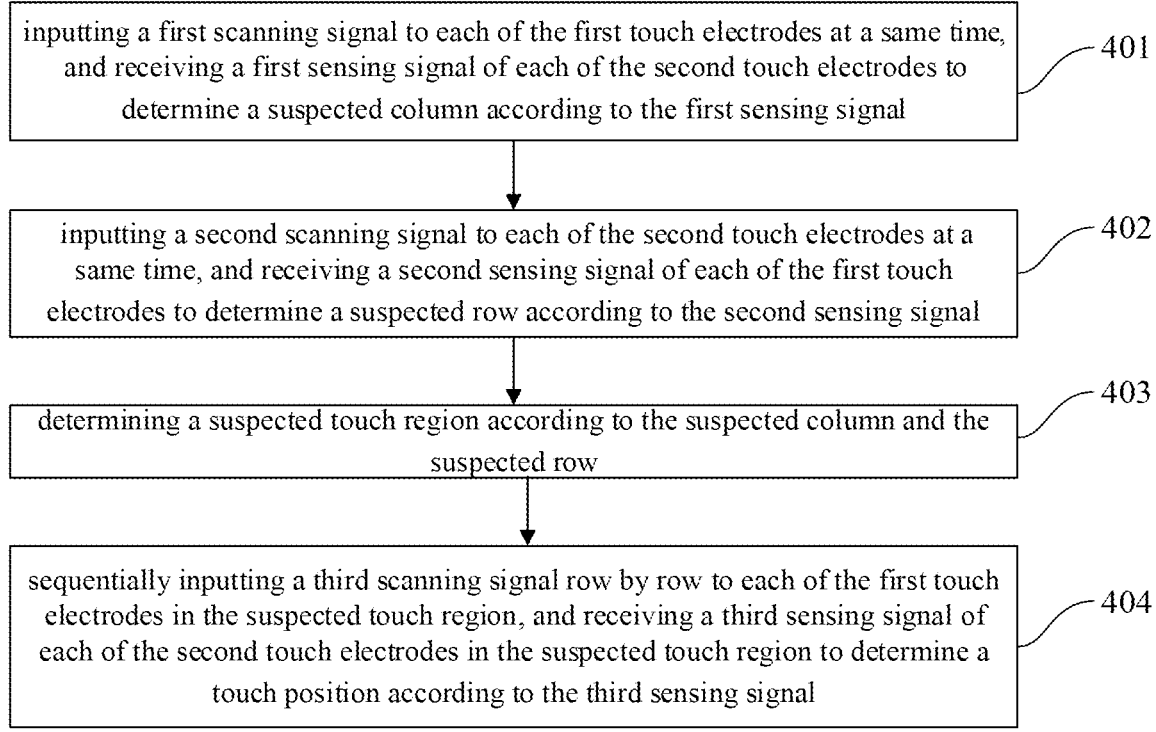
FIG. 4 illustrates a flow chart of a touch panel driving method according to some embodiments of the present disclosure.

Referring to the FIG. 4, illustrating a flow chart of a touch panel driving method according to some embodiments of the present disclosure, specifically the following steps may be included:

step 401, inputting a first scanning signal to each of the first touch electrodes at a same time, and receiving a first sensing signal of each of the second touch electrodes to determine a suspected column according to the first sensing signal.

Figure 5:
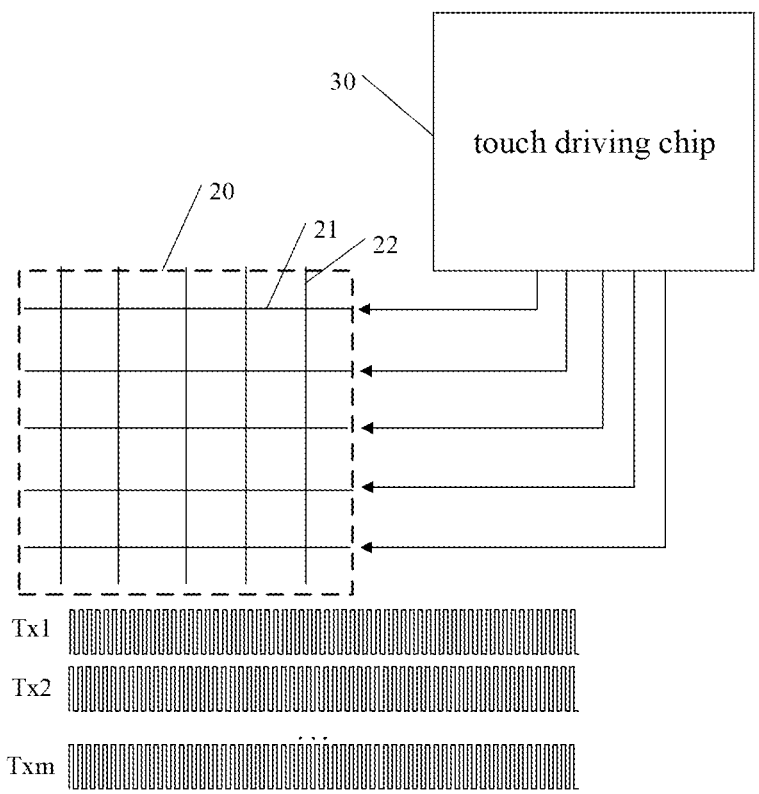
FIG. 5 illustrates a schematic diagram of inputting a first scanning signal to each of the first touch electrodes at a same time according to some embodiments of the present disclosure.
Figure 6:
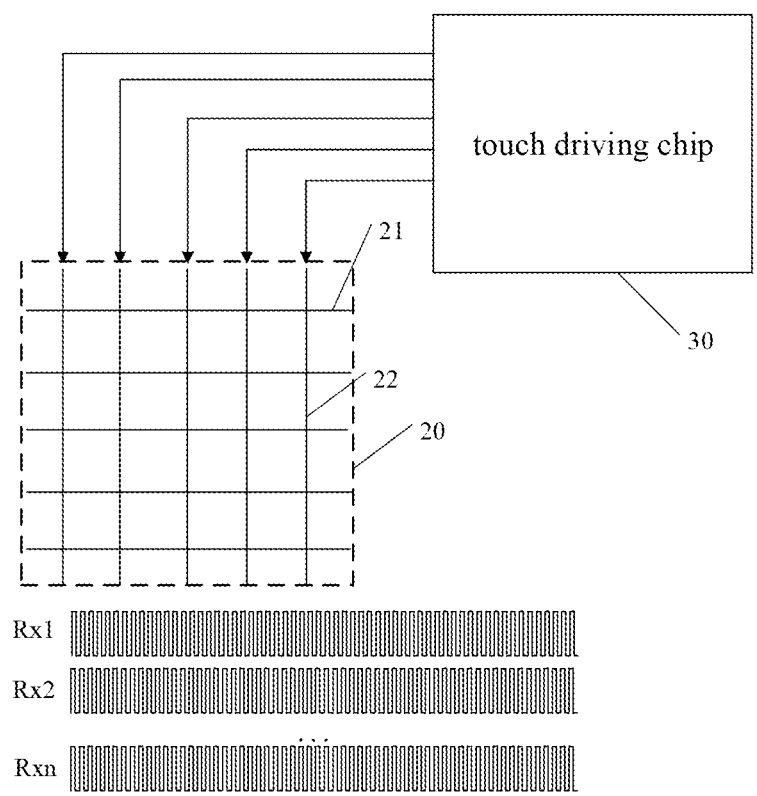
FIG. 6 illustrates a schematic diagram of inputting a second scanning signal to each of the second touch electrodes at a same time according to some embodiments of the present disclosure.

In the embodiment of the present disclosure, as shown in FIG. 5 and FIG. 6, the touch panel 20 includes a plurality of first touch electrodes 21 distributed along a row direction and a plurality of second touch electrodes 22 distributed along a column direction, each of the first touch electrodes 21 includes a plurality of first touch sub-electrodes, each of the second touch electrodes 22 includes a plurality of second touch sub-electrodes.

Wherein, the first touch electrodes 21 are the touch driving electrodes, the second touch electrodes 22 are the touch sensing electrodes, at this moment, the corresponding structure of the touch panel is similar to FIG. 1 (the structure shown in the FIG. 5 and FIG. 6 is the schematic diagram of the simplified touch panel, which only represents the position relation between the first touch electrodes 21 and the second touch electrodes 22).

As shown in the FIG. 5, the first scanning signal is input to each of the first touch electrodes 21 at a same time through a touch driving chip 30, the touch driving chip 30 receives the first sensing signal of each of the second touch electrodes 22, that is, the first touch electrodes 21 of all rows are scanned at a same time, the sensing signals of the second touch electrodes 22 of all columns are received synchronously, then the touch driving chip 30 determines the suspected column corresponding to the suspected touch position according to the first sensing signal of each of the second touch electrodes 22.

For example, for the touch panel of 75 GG, the first touch electrodes 21 are the touch driving electrodes, the second touch electrodes 22 are the touch sensing electrodes. The number of the touch driving electrodes 21 distributed along the row direction is 126, the number of the touch sensing electrodes 22 distributed along the column direction is 228. A resistance R1 of the touch driving electrode 21 is 14 KΩ. A resistance R2 of the touch sensing electrode 22 is 16 KΩ. A crossover capacitance C of the touch driving electrode 21 and the touch sensing electrode 22 is 600 pF. In addition, the number of the AFE and the number of the ADC in the AFE are 114, and the number of the Rx channels is 228. When the first touch electrodes 21 of all rows are scanned at a same time, the AFE needs time-sharing multiplexing. This moment, one frame touch panel is divided into two sub-frames, the first sub-frame only scans the results of Rx1 to Rx114, and the second sub-frame scans the results of Rx115 to Rx228.

Therefore, for a row synchronous scanning, the time of scanning one sub-frame is equal to the time of scanning one Tx channel. That is, the time of scanning one sub-frame is: Tx scanning signal cycle×sampling frequency=2.2×RC×2.86×3=2.2×(14×600/4)×2.86×3=13.2 μs×3=39.6 μs, the time of the row synchronous scanning one frame touch panel is: the time of scanning one sub-frame×(the number of the Rx channels/the number of the AFE), that is, 39.6 μs×(228/114)=79.2 μs.

Step 402, inputting a second scanning signal to each of the second touch electrodes at a same time, and receiving a second sensing signal of each of the first touch electrodes to determine a suspected row according to the second sensing signal.

In the embodiment of the present disclosure, as shown in FIG. 6, through the touch driving chip 30, the second scanning signal is input to each of the second touch electrodes 22 at a same time, the touch driving chip 30 receives the second sensing signal of each of the first touch electrode 21, that is, the second touch electrodes 22 of all columns are scanned at a same time, and the second sensing signals of the first touch electrode 21 of all rows are synchronously received. Then, the touch driving chip 30 determines the suspected row corresponding to the suspected touch position according to the second sensing signal of each of the first touch electrodes 21.

For example, for the touch panel of 75 GG, the first touch electrodes 21 are the touch driving electrodes, the second touch electrodes 22 are the touch sensing electrodes. Since the number of Tx channels is 126, and the number of AFE and the number of ADC in AFE are 114. Therefore, when the second touch electrodes 22 of all columns are scanned at a same time, the AFE needs time-sharing multiplexing. At this moment, one frame touch panel is divided into two sub-frames, the first sub-frame only scans Tx1 to Tx63, and the second sub-frame only scans Tx64 to Tx126, or the first sub-frame only scans Tx1 to Tx114, and the second sub-frame only scans Tx115 to Tx126. The method of scanning of the sub-frame is not specifically limited in the embodiment of the present disclosure.

Therefore, for a column synchronous scanning, the time of scanning one sub-frame is equal to the time of scanning one Rx channel. That is, the time of scanning one sub-frame is: Rx scanning signal cycle×sampling frequency=2.2×RC×2.86×3=2.2×16×600×2.86×3=181 μs, the time of the column synchronous scanning one frame touch panel is: the time of scanning one sub-frame×2, that is, 181 μs×2=362 μs.

It should be noted that, the sequence of step 401 and step 402 may be interchanged, that is, the first touch electrodes 21 of all rows can be scanned at a same time, then the second touch electrodes 22 of all columns can be scanned at a same time. The second touch electrodes 22 of all columns can also be firstly scanned at a same time, and then the first touch electrodes 21 of all rows can be scanned at a same time.

Step 403, determining a suspected touch region according to the suspected column and the suspected row.

In the embodiment of the present disclosure, after determining the suspected row and the suspected column, the suspected touch region corresponding to the suspected touch position is determined according to the suspected row and the suspected column.

Step 404, sequentially inputting a third scanning signal row by row to each of the first touch electrodes in the suspected touch region, and receiving a third sensing signal of each of the second touch electrodes in the suspected touch region to determine a touch position according to the third sensing signal.

In the embodiment of the present disclosure, after determining the suspected touch region, the touch driving chip 30 sequentially inputs the third scanning signal row by row to each of the first touch electrodes in the suspected touch region, the touch driving chip 30 receives the third sensing signal of each of the second touch electrodes in the suspected touch region. Then, the touch driving chip 30 determines the final touch position according to the third sensing signal of each of the second touch electrodes in the suspected touch region.

For example, for the touch panel of 75 GG, assuming the worst case, two suspected touch positions are detected by step 401 and the step 402. One suspected touch position is located in the first column of the first row, the other suspected touch position is located in the $228^{th}$ column of the $126^{th}$ row. At the moment, in the step 404, all of the touch driving electrodes need to be scanned row by row. At this time, the scanning time of the corresponding one frame touch panel is equal to the time of scanning one frame touch panel in the related art, that is, 9979.2 µs.

Therefore, the time required for detecting the touch position of the embodiment of the present disclosure is: the time of the row synchronous scanning one frame touch panel+the time of the column synchronous scanning one frame touch panel+the time of scanning one frame touch panel=79.2 µs+362 µs+9979.2 µs=10420.4 µs. Compared with the time 29937.6 µs required for detecting the touch position of row by row scanning the three frames of the related art, the time required for detecting the touch position of the embodiment of the present disclosure is reduced by 65%, thereby shortening the time required for detecting the touch position, that is, the touch response time is shortened.

Certainly, in practical applications, if the determined suspected touch region is smaller than the region where the touch panel 20 is located, that is, not all of the touch driving electrodes are scanned row by row. When the $3^{rd}$ frame is scanned, the scanning time of the suspected touch region is smaller than the scanning time of one frame touch panel, which further shortens the touch response time.

Figure 7:
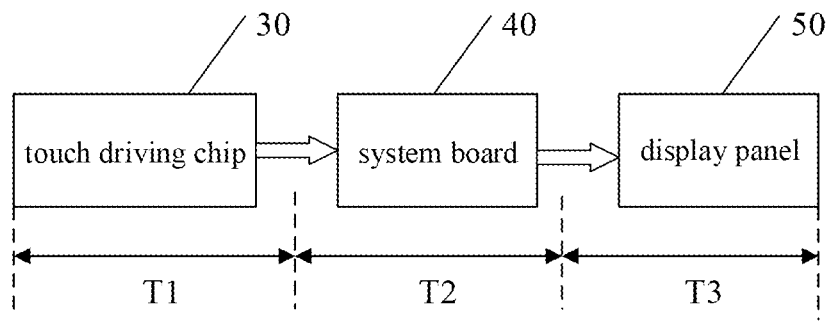
FIG. 7 illustrates a schematic diagram of a whole machine response time according to some embodiments of the present disclosure.

As shown in the FIG. 7, the touch driving chip 30 scans the touch panel 20 to detect the touch position, and the required time of sending the coordinates of the touch position to a system board 40 is T1, that is, the touch response time is T1. The system board 40 calls the corresponding software and matches the corresponding operations according to the coordinates of the touch position, and integrates the corresponding operations into the required display data. The required time of sending the display data to a display panel 50 is T2, that is, the response time of the system board is T2. The required time that the display panel 50 displays the corresponding picture according to the sent display data is T3, that is, the response time of the display panel is T3.

The whole machine response time T of the touch display device is: the touch response time T1+the response time of the system board T2+the response time of the display panel T3. Since the embodiment of the present disclosure shortens the touch response time T1, the whole machine response time T of the touch display device is also shortened accordingly, and the effect of real-time display may be realized.

It should be noted that the first scanning signal, the second scanning signal and the third scanning signal may be square wave signals or sine wave signals.

In the embodiment of the present disclosure, the suspected column is determined by providing the first scanning signals to all of the first touch electrodes distributed along the row direction at a same time. And the suspected row is determined by providing the second scanning signals to all of the second touch electrodes distributed along the column direction at a same time. The suspected touch region is determined according to the suspected column and the suspected row. Finally, each of the first touch electrodes in the suspected touch region is scanned row by row, then the required time of determining the suspected row and the suspected column in the first two frames is greatly shortened, so that the required time to detect the touch position is shortened, that is, the touch response time is shortened, and the whole machine response time of the touch display device is shortened, which can realize the effect of real-time display.

Figure 8:
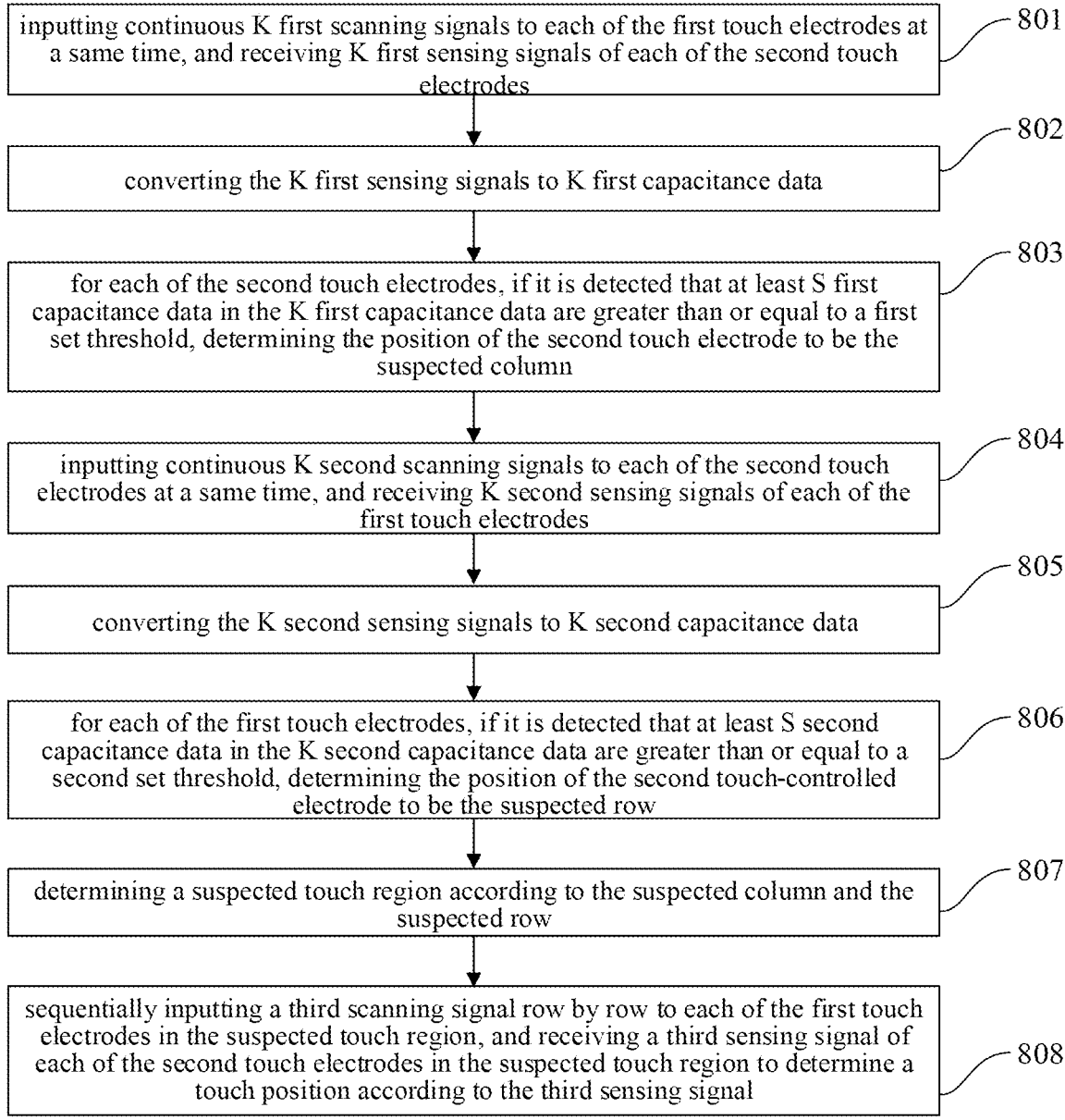
FIG. 8 illustrates a specific flow chart of a touch panel driving method according to some embodiments of the present disclosure.

Referring to the FIG. 8, illustrating a specific flow chart of a touch panel driving method according to some embodiments of the present disclosure, specifically, the following steps may be included:

step 801, inputting continuous K first scanning signals to each of the first touch electrodes at a same time, and receiving K first sensing signals of each of the second touch electrodes.

In the embodiment of the present disclosure, as shown in the FIG. 5 and FIG. 6, the touch panel 20 includes a plurality of first touch electrodes 21 distributed along a row direction and a plurality of second touch electrodes 22 distributed along a column direction, each of the first touch electrodes 21 includes a plurality of first touch sub-electrodes, each of the second touch electrodes 22 includes a plurality of second touch sub-electrodes. Wherein, the first touch electrodes 21 are the touch driving electrodes, the second touch electrodes 22 are the touch sensing electrodes.

As shown in the FIG. 5, continuous K first scanning signals are input to each of the first touch electrodes 21 at a same time though the touch driving chip 30, and the touch driving chip 30 receives K first sensing signals of each of the second touch electrodes 22.

Step 802, converting the K first sensing signals to K first capacitance data.

In the embodiment of the present disclosure, the AFE is set in the touch driving chip 30, and ADC is set in the AFE, the K first sensing signals received by the touch driving chip 30 are analog signals. The K first sensing signals are converted to digital signals representing a capacitance size through the ADC, that is, converted to the K first capacitance data.

Step 803, for each of the second touch electrodes, if it is detected that at least S first capacitance data in the K first capacitance data are greater than or equal to a first set threshold, determining the position of the second touch electrode to be the suspected column.

In the embodiment of the present disclosure, for each of the second touch electrodes 22, if the touch driving chip 30 detects that at least S first capacitance data in the K first capacitance data are greater than or equal to the first set threshold, the position of the second touch electrode 22 is determined to be the suspected column. Wherein, K is greater than or equal to S, and S is a positive integer greater than 1.

For example, K is equal to 3 and S is equal to 2, the continuous three first scanning signals are input to each of the first touch electrodes 21 at a same time, and three first sensing signals of each of the second touch electrodes 22 are received. The three first sensing signals are converted to three first capacitance data. For each of the second touch electrodes 22, if at least 2 first capacitance data in the 3 first capacitance data are greater than or equal to the first set threshold, the position of the second touch electrode 22 is determined to be the suspected column.

Step 804, inputting continuous K second scanning signals to each of the second touch electrodes at a same time, and receiving K second sensing signals of each of the first touch electrodes.

In the embodiment of the present disclosure, as shown in the FIG. 6, the continuous K second scanning signals are input to each of the second touch electrodes 22 at a same time though the touch driving chip 30, and the touch driving chip 30 receives K second sensing signals of each of the first touch electrodes 21.

Step 805, converting the K second sensing signals to K second capacitance data.

In the embodiment of the present disclosure, the K second sensing signals received by the touch driving chip 30 are analog signals. The K second sensing signals are converted to digital signals representing a capacitance size through the ADC, that is, converted to the K second capacitance data.

Step 806, for each of the first touch electrodes, if it is detected that at least S second capacitance data in the K second capacitance data are greater than or equal to a second set threshold, determining the position of the second touch electrode to be the suspected row.

In the embodiment of the present disclosure, for each of the first touch electrodes 21, if the touch driving chip 30 detects that at least S first capacitance data in the K second capacitance data are greater than or equal to the second set threshold, the position of the first touch electrode 21 is determined to be the suspected row. Wherein, K is greater than or equal to S, and S is a positive integer greater than 1.

For example, K is equal to 3 and S is equal to 2, the continuous three second scanning signals are input to each of the second touch electrodes 22 at a same time, and three second sensing signals of each of the first touch electrodes 21 are received. The three second sensing signals are converted to three second capacitance data. For each of the first touch electrodes 21, if at least 2 second capacitance data in the 3 second capacitance data are greater than or equal to the second set threshold, the position of the first touch electrode 21 is determined to be the suspected row.

It should be noted that the first set threshold and the second set threshold can be determined according to experiments, which can be equal or unequal.

Step 807, determining a suspected touch region according to the suspected column and the suspected row.

In the embodiment of the present disclosure, after determining the suspected row and the suspected column, the suspected touch region corresponding to the suspected touch position is determined according to the suspected row and the suspected column.

For the first case, when the suspected row and the suspected column are both one, the step 807 specifically includes sub-step A110 to sub-step A150:

sub-step A110, adding a first preset value to a row number where the suspected row is located to obtain a first target row number;

sub-step A120, subtracting a second preset value from a row number where the suspected row is located to obtain a second target row number;

sub-step A130, adding a third preset value to a column number where the suspected column is located to obtain a first target column number;

sub-step A140, subtracting a fourth preset value from a column number where the suspected column is located to obtain a second target column number; and sub-step A150, determining a region surrounded by the first target row number, the second target row number, the first target column number and the second target column number as the suspected touch region.

For the touch panel 20 with N columns and M rows, if the suspected row and the suspected column are both one, and the row number where the suspected row is located is the $X^{th}$ row. The column number where the suspected column is located is the $Y^{th}$ column. The row number X where the suspected row is located adds the first preset value to obtain the first target row number. The row number X where the suspected row is located subtracts the second preset value to obtain the second target row number. The column number Y where the suspected column is located adds the third preset value to obtain the first target column number. The column number Y where the suspected column is located subtracts the fourth preset value to obtain the second target column number. The region surrounded by the first target row number, the second target row number, the first target column number and the second target column number is determined as the suspected touch region.

Wherein, the first preset value, the second preset value, the third preset value and the fourth preset value may be same or may also be different.

For example, the first preset value, the second preset value, the third preset value and the fourth preset value are 3, the first target row number is the $(X+3)^{th}$ row, the second target row number is the $(X-3)^{th}$ row, the first target column number is the $(Y+3)^{th}$ column, the second target column number is the $(Y-3)^{th}$ column. And the suspected touch region is the region surrounded by the $(X-3)^{th}$ row, the $(X+3)^{th}$ row, the $(Y-3)^{th}$ column and the $(Y+3)^{th}$ column. There are 49 first touch electrodes and 49 second touch electrodes in the suspected touch region.

For the second case, when the suspected row and the suspected column are both multiple, the step 807 specifically includes sub-step A160 to sub-step A220:

sub-step A160, determining a maximum value and a minimum value of row numbers where a plurality of suspected rows are located as a maximum suspected row number and a minimum suspected row number, respectively;

sub-step A170, determining a maximum value and a minimum value of column numbers where a plurality of suspected columns are located as a maximum suspected column number and a minimum suspected column number, respectively;

sub-step A180, adding a first preset value to the maximum suspected row number to obtain a first target row number;

sub-step A190, subtracting a second preset value from the minimum suspected row number to obtain a second target row number;

sub-step A200, adding a third preset value to the maximum suspected column number to obtain a first target column number;

sub-step A210, subtracting a fourth preset value from the minimum suspected column number to obtain a second target column number; and sub-step A220, determining a region surrounded by the first target row number, the second target row number, the first target column number and the second target column number as the suspected touch region.

For the touch panel 20 with N columns and M rows, if the suspected row and the suspected column are multiple, the row numbers where the suspected rows are located are the $X1^{th}$ row, the $X2^{th}$ row to the $Xa^{th}$ row. The column numbers where the suspected columns are located are the $Y1^{th}$ column, the $Y2^{th}$ column to the $Yb^{th}$ column. Firstly, calculating Xmin=Min(X1, X2, . . . , Xa), Xmax=Max(X1, X2, . . . , Xa), that is, the maximum value Xmax and the minimum value Xmin are selected from the row numbers where the multiple suspected rows are located. The maximum value Xmax and the minimum value Xmin of the row numbers where the multiple suspected rows are located are determined to be the maximum suspected row number (the $Xmax^{th}$ column) and the minimum suspected row number (the $Xmin^{th}$ column). Accordingly, calculating Ymin=Min(Y1, Y2, . . . , Yb), Ymax=Max(Y1, Y2, . . . , Yb), the maximum value Ymax and the minimum value Ymin are selected from the column numbers where the multiple suspected columns are located. The maximum value Ymax and the minimum value Ymin of the row numbers where the multiple suspected columns are located are determined to be the maximum suspected column number (the $Ymax^{th}$ column) and the minimum suspected column number (the $Ymin^{th}$ column).

Subsequently, the maximum suspected row number Xmax adds the first preset value to obtain the first target row number. The minimum suspected row number Xmin subtracts the second preset value to obtain the second target row number. The maximum suspected column number Ymax adds the third preset value to obtain the first target column number. The minimum suspected column number Ymin subtracts the fourth preset value to obtain the second target column number. The region surrounded by the first target row number, the second target row number, the first target column number and the second target column number is determined as the suspected touch region.

Wherein, the first preset value, the second preset value, the third preset value and the fourth preset value may be same or may also be different.

For example, the first preset value, the second preset value, the third preset value and the fourth preset value are 3, the first target row number is the $(Xmax+3)^{th}$ row, the second target row number is the $(Xmin-3)^{th}$ row, the first target column number is the $(Ymax+3)^{th}$ column, the second target column number is the $(Ymin-3)^{th}$ column. And the suspected touch region is the region surrounded by the $(Xmin-3)^{th}$ row, the $(Xmax+3)^{th}$ row, the $(Ymin-3)^{th}$ column and the $(Ymax+3)^{th}$ column.

For the touch panel 20 with N columns and M rows, if the suspected touch region is larger than the region where the whole touch panel 20 is located, that is, Xmin-3 is less than 1, Xmax+3 is greater than M, Ymin-3 is less than 1, Ymax+3 is greater than N, the touch panel 20 with N columns and M rows is scanned row by row.

In addition, in practical applications, when the suspected rows are multiple, the suspected column is one, the maximum value and the minimum value of row numbers where a plurality of suspected rows are located are determined as the maximum suspected row number and the minimum suspected row number. The maximum suspected row number adds the first preset value to obtain the first target row number. The minimum suspected row number subtracts the second preset value to obtain the second target row number. The column number where the suspected column is located adds the third preset value to obtain the first target column number. The column number where the suspected column is located subtracts the fourth preset value to obtain the second target column number. The region surrounded by the first target row number, the second target row number, the first target column number and the second target column number is determined as the suspected touch region.

When the suspected row is one, the suspected columns are multiple, the maximum value and the minimum value of column numbers where a plurality of suspected columns are located are determined as the maximum suspected column number and the minimum suspected column number. The row number where the suspected row is located adds the first preset value to obtain the first target row number. The row number where the suspected row is located suspects the second preset value to obtain the second target row number. The maximum suspected column number adds the third preset value to obtain the first target column number. The minimum suspected column number subtracts the fourth preset value to obtain the second target column number. The region surrounded by the first target row number, the second target row number, the first target column number and the second target column number is determined as the suspected touch region.

It should be noted that the first preset value, the second preset value, the third preset value and the fourth preset value are not limited to 3, and other values can also be used, such as the first preset value, the second preset value, the third preset value and the fourth preset value are 4 or 5 and so on. By selecting an appropriate value of the first preset value, the second preset value, the third preset value and the fourth preset value, the touch response time will not be too long, and the detection accuracy of the touch position will not be affected.

Step 808, sequentially inputting a third scanning signal row by row to each of the first touch electrodes in the suspected touch region, and receiving a third sensing signal of each of the second touch electrodes in the suspected touch region to determine a touch position according to the third sensing signal.

This step is similar to the principle of step 404 in the above embodiments, which is not repeated here.

In the embodiment of the present disclosure, the suspected column is determined by providing the first scanning signals to all of the first touch electrodes distributed along the row direction at a same time. And the suspected row is determined by providing the second scanning signals to all of the second touch electrodes distributed along the column direction at a same time. The suspected touch region is determined according to the suspected column and the suspected row. Finally, each of the first touch electrodes in the suspected touch region is scanned row by row, then the required time of determining the suspected row and the suspected column in the first two frames is greatly shortened, so that the required time to detect the touch position is shortened, that is the touch response time is shortened, and the whole machine response time of the touch display device is shortened, which can realize the effect of real-time display.

Figure 9:
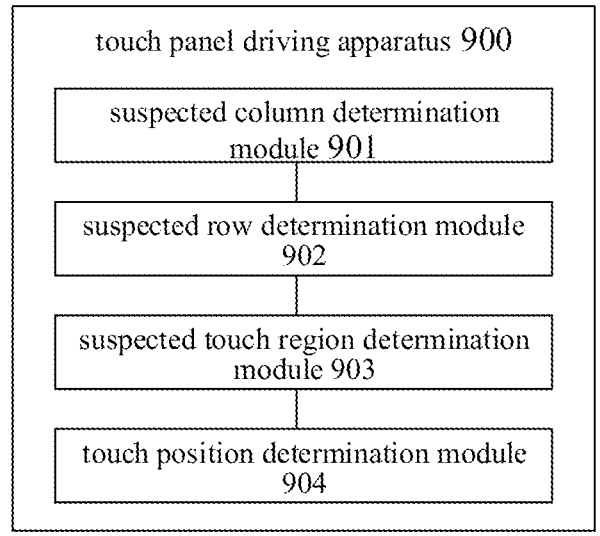
FIG. 9 illustrates a structural block diagram of a touch panel driving apparatus according to some embodiments of the present disclosure.

Referring to the FIG. 9, illustrating a structural block diagram of a touch panel driving apparatus according to some embodiments of the present disclosure.

Some embodiments of the present disclosure provide a touch panel driving apparatus 900, wherein the touch panel includes a plurality of first touch electrodes distributed along a row direction and a plurality of second touch electrodes distributed along a column direction, the touch panel driving apparatus 900 includes:

- a suspected column determination module 901 configured for inputting a first scanning signal to each of the first touch electrodes at a same time, and receiving a first sensing signal of each of the second touch electrodes to determine a suspected column according to the first sensing signal;
- a suspected row determination module 902 configured for inputting a second scanning signal to each of the second touch electrodes at a same time, and receiving a second sensing signal of each of the first touch electrodes to determine a suspected row according to the second sensing signal;
- a suspected touch region determination module 903 configured for determining a suspected touch region according to the suspected column and the suspected row; and
- a touch position determination module 904 configured for sequentially inputting a third scanning signal row by row to each of the first touch electrodes in the suspected touch region, and receiving a third sensing signal of each of the second touch electrodes in the suspected touch region to determine a touch position according to the third sensing signal.

Optionally, when the suspected row and the suspected column are both one, the suspected touch region determination module 903 includes:

- a row number first calculation sub-module configured for adding a first preset value to a row number where the suspected row is located to obtain a first target row number;
- a row number second calculation sub-module configured for subtracting a second preset value from a row number where the suspected row is located to obtain a second target row number;
- a column number first calculation sub-module configured for adding a third preset value to a column number where the suspected column is located to obtain a first target column number;
- a column number second calculation sub-module configured for subtracting a fourth preset value from a column number where the suspected column is located to obtain a second target column number; and
- a suspected touch region first determination sub-module configured for determining a region surrounded by the first target row number, the second target row number, the first target column number and the second target column number as the suspected touch region.

Optionally, when the suspected row and the suspected column are both multiple, the suspected touch region determination module 903 includes:

- a suspected row number determination sub-module configured for determining a maximum value and a minimum value of row numbers where a plurality of suspected rows are located as a maximum suspected row number and a minimum suspected row number, respectively;
- a suspected column number determination sub-module configured for determining a maximum value and a minimum value of column numbers where a plurality of suspected columns are located as a maximum suspected column number and a minimum suspected column number, respectively;
- a row number third calculation sub-module configured for adding a first preset value to the maximum suspected row number to obtain a first target row number;
- a row number fourth calculation sub-module configured for subtracting a second preset value from the minimum suspected row number to obtain a second target row number;
- a column number third calculation sub-module configured for adding a third preset value to the maximum suspected column number to obtain a first target column number;
- a column number fourth calculation sub-module configured for subtracting a fourth preset value from the minimum suspected column number to obtain a second target column number; and
- a suspected touch region second determination sub-module configured for determining a region surrounded by the first target row number, the second target row number, the first target column number and the second target column number as the suspected touch region.

Optionally, the suspected column determination module 901 includes:

- a first sensing signal receiving sub-module configured for inputting continuous K first scanning signals to each of the first touch electrodes at a same time, and receiving K first sensing signals of each of the second touch electrodes;
- a first capacitance data converting module configured for converting the K first sensing signals to K first capacitance data;
- a suspected column determination sub-module configured for, for each of the second touch electrodes, if it is detected that at least S the first capacitance data in the K first capacitance data are greater than or equal to a first set threshold, determining the position of the second touch electrode to be the suspected column;
- wherein, K is greater than or equal to S, and S is a positive integer greater than 1.

Optionally, the suspected row determination module 902 includes:

- a second sensing signal receiving sub-module configured for inputting continuous K second scanning signals to each of the second touch electrodes at a same time, and receiving K second sensing signals of each of the first touch electrodes;
- a second capacitance data converting sub-module configured for converting the K second sensing signals to K second capacitance data;
- a suspected row determination sub-module configured for, for each of the first touch electrodes, if it is detected that at least S second capacitance data in the K second capacitance data are greater than or equal to a second set threshold, determining the position of the second touch electrode to be the suspected row;
- wherein, K is greater than or equal to S, and S is a positive integer greater than 1.

Optionally, the first touch electrode is the touch driving electrode, and the second touch electrode is the touch sensing electrode.

In the embodiment of the present disclosure, the suspected column is determined by providing the first scanning signals to all of the first touch electrodes distributed along the row direction at a same time. And the suspected row is determined by providing the second scanning signals to all of the second touch electrodes distributed along the column direction at a same time. The suspected touch region is determined according to the suspected column and the suspected row. Finally, each of the first touch electrodes in the suspected touch region is scanned row by row, then the required time of determining the suspected row and the suspected column in the first two frames is greatly shortened, so that the required time to detect the touch position is shortened, that is, the touch response time is shortened, and the whole machine response time of the touch display device is shortened, which can realize the effect of real-time display.

Figure 10:
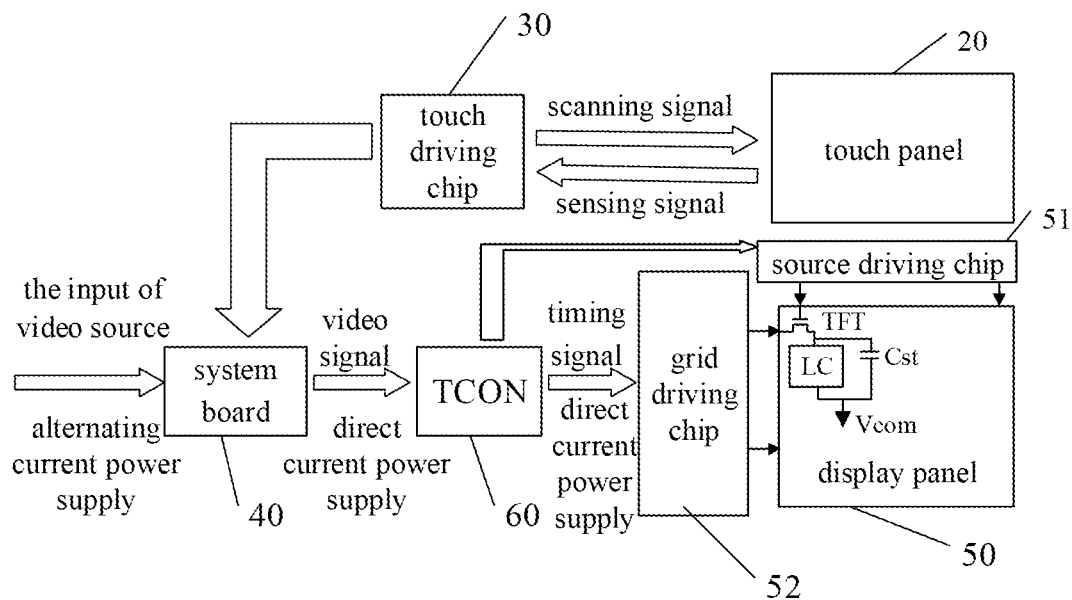
FIG. 10 illustrates a structural schematic diagram of a touch display device according to some embodiments of the present disclosure.

Referring to the FIG. 10, illustrating a structural schematic diagram of a touch display device according to some embodiments of the present disclosure.

As shown in the FIG. 10, the touch display device includes the touch panel 20 and the touch panel driving apparatus 900 described above. Wherein, the actual corresponding device of the touch panel driving apparatus 900 is the touch driving chip 30, the touch driving chip 30 is connected to the touch panel 20. The AFE in the touch driving chip 30 provides the scanning signals to the touch panel 20, and receives the sensing signals to determine the touch position.

Certainly, the touch display device further includes: the system board 40 connected to the touch driving chip 30, a timer control register (TCON) 60 connected to the system board 40, a source driving chip 51 and a grid driving chip 52 connected to the timer control register 60, and a display panel 50 connected to the source driving chip 51 and the grid driving chip 52.

The system board 40 receives an input of the external video source, and sends the video signal to the timer control register 60. The timer control register 60 converts the video signal to the timing signal and data signal, sends the timing signal to the grid driving chip 52, and sends the data signal to the source driving chip 51. The grid driving chip 52 controls the thin film transistor (TFT) in the display panel 50 to open, and the source driving chip 51 inputs the data signal to the source of the TFT. A drain of the TFT is connected to the pixel electrode. A liquid crystal (LC) is set between the pixel electrode and the common electrode Vcom. The deflection of the liquid crystal is controlled by the voltage applied between the pixel electrode and the common electrode Vcom to realize the display of the screen. In addition, a storage capacitance Cst is set between the drain of the TFT and the common electrode Vcom to ensure that the voltage applied at both ends of the liquid crystal can be maintained to the next frame of the screen refresh.

In addition, the system board 40 also receives the external input alternating current power supply, the alternating current power supply is converted into the direct current power supply to be provided to the timer control register 60 and other devices, to supply power to various devices.

In practical applications, the touch display device may be mobile phones, tablet panel computers, monitors, laptop computers navigators, electronic whiteboards and any other products or components with display and touch function.

In the embodiment of the present disclosure, the suspected column is determined by providing the first scanning signals to all of the first touch electrodes distributed along the row direction at a same time. And the suspected row is determined by providing the second scanning signals to all of the second touch electrodes distributed along the column direction at a same time. The suspected touch region is determined according to the suspected column and the suspected row. Finally, each of the first touch electrodes in the suspected touch region is scanned row by row, then the required time of determining the suspected row and the suspected column in the first two frames is greatly shortened, so that the required time to detect the touch position is shortened, that is, the touch response time is shortened, and the whole machine response time of the touch display device is shortened, which can realize the effect of real-time display.

The device embodiments described above is only schematic, the units illustrated as separated parts may be or may not be separated physically, and the parts shown in unit may be or may not be a physical unit. That is, the parts may be located at one place or distributed in multiple network units. A skilled person in the art may select part or all modules therein to realize the objective of achieving the technical solution of the embodiment. Those of ordinary skill in the art can understand and implement it without creative effort.

The embodiments of each component in the present disclosure can be implemented by hardware, or by software modules running on one or more processors, or by their combination. A person skilled in the art should understand that the microprocessor or digital signal processor (DSP) can be used in practice to realize some or all functions of some or all components in the calculation and processing equipment according to the embodiments of the present disclosure the present disclosure. The present disclosure can also be implemented as the equipment or device programs (for example, computer programs and computer program products) used to execute part or all of the methods described here. The programs of implementing the present disclosure may be stored in a computer readable medium, or can have the form of one or more signals. Such signals can be downloaded from the Internet site, or provided on the carrier signal, or provided in any other form.

Figure 11:
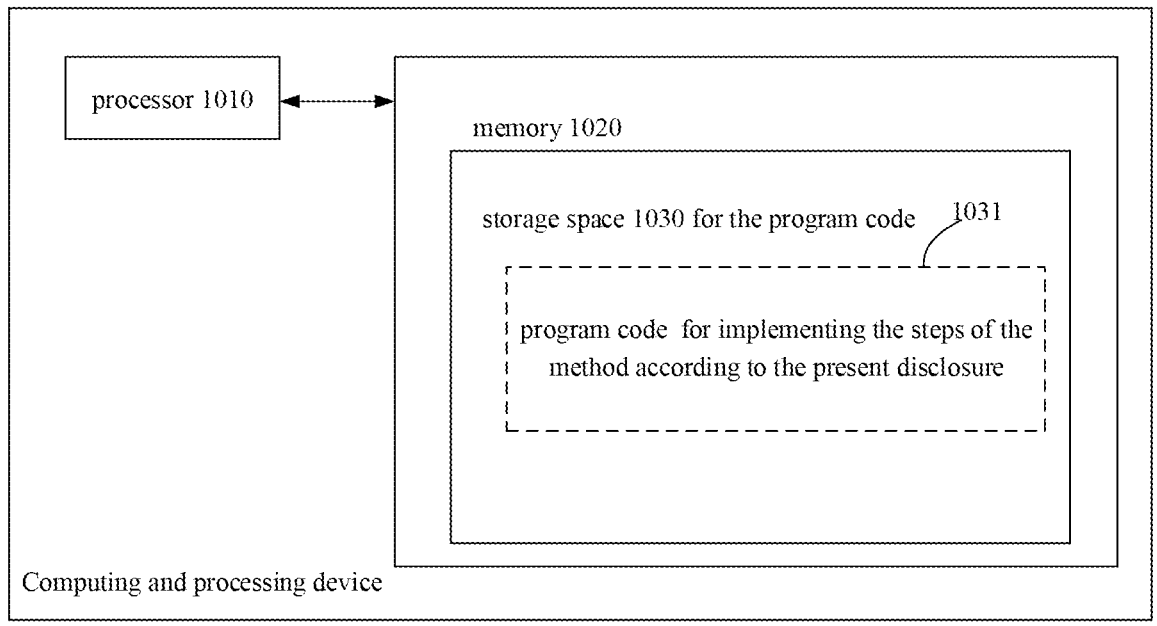
FIG. 11 schematically illustrates a block diagram of the computing and processing device for executing the method according to the present disclosure.
Figure 12:
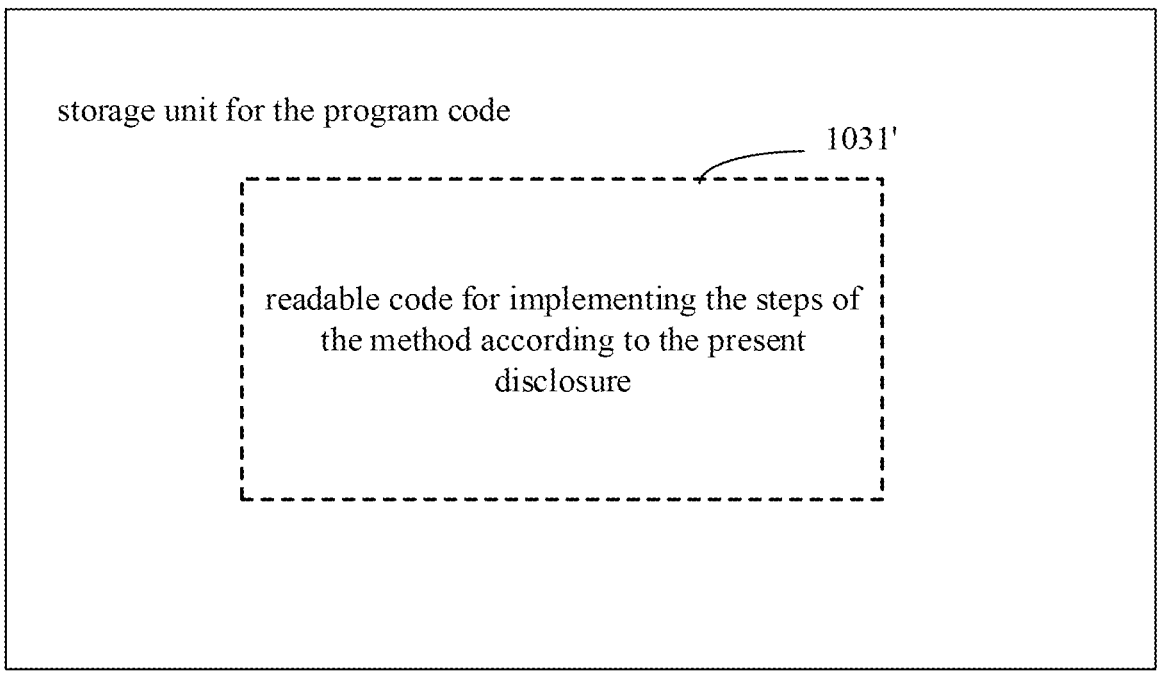
FIG. 12 schematically illustrates a storage unit for maintaining or carrying the program code which implements the method according to the present disclosure.

For example, FIG. 11 shows a computing and processing device that can implement the method according to the present disclosure. The computing and processing device traditionally includes a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 12. The storage unit may have storage segments or storage spaces with similar arrangement to the memory 1020 of the computing and processing device in FIG. 11. The program codes may, for example, be compressed in a suitable form. Generally, the storage unit contains a computer-readable code 1031', which can be read by a processor like 1010. When those codes are executed by the computing and processing device, the codes cause the computing and processing device to implement each of the steps of the method described above.

The description provided herein describes many concrete details. However, it can be understood that the embodiments of the present disclosure may be implemented without those concrete details. In some of the embodiments, well-known processes, structures and techniques are not described in detail, so as not to affect the understanding of the description. For the afore-mentioned embodiments of various methods, for simple description, they are expressed as a series of action combinations, but a person skilled in the art should know that the present disclosure is not limited by the order of action described, because according to the present disclosure, certain steps can be taken in other order or simultaneously. Secondly, a person skilled in the art should also know that the implementation described in the description are all preferred embodiments, and the actions and modules involved are not necessary for the present disclosure.

Various embodiments in the description are described in a progressive manner, each of the embodiments focuses on the differences with other embodiments. The same or similar parts of the various embodiments can be referred to each other.

Finally, it should also be noted that in this article, relational terms such as first and second are used only to distinguish one entity or operation from another without necessarily requiring or implying any such actual relationship or order between these entities or operations. Moreover, the term 'including', 'containing' or any other variant is intended to cover non-exclusive inclusion, so that the process, method, commodity or equipment that includes a series of elements includes not only those elements, but also other elements that are not clearly listed, or also includes the inherent elements of such process, method, commodity or equipment. Without more restrictions, the limited elements by the sentence 'includes one . . . ' do not exclude that there are other same elements in the process, method, commodity or equipment that include the elements.

A touch panel driving method, an apparatus, and a touch display device provided by the present disclosure above are introduced in detail. In this paper, the principle and embodiments of the present disclosure expounded with specific examples. The above description of the embodiments is only used to help understand the method and core idea of the present disclosure. At the same time, for the general technical personnel in the art, according to the idea of the present disclosure, there will be changes in the specific embodiments and application scope. In summary, the content of this specification should not be understood as the limitation of this disclosure.

The invention claimed is:

1. A touch panel driving method, wherein, the touch panel comprises a plurality of first touch electrodes distributed along a row direction and a plurality of second touch electrodes distributed along a column direction, and the method comprises:
inputting a first scanning signal to each of the first touch electrodes at a same time, and receiving a first sensing signal of each of the second touch electrodes to determine a suspected column according to the first sensing signal;
inputting a second scanning signal to each of the second touch electrodes at a same time, and receiving a second sensing signal of each of the first touch electrodes to determine a suspected row according to the second sensing signal;
determining a suspected touch region according to the suspected column and the suspected row; and
sequentially inputting a third scanning signal row by row to each of the first touch electrodes in the suspected touch region, and receiving a third sensing signal of each of the second touch electrodes in the suspected touch region to determine a touch position according to the third sensing signal;
wherein when the suspected row is one suspected row and the suspected column is one suspected column, the step of determining the suspected touch region according to the suspected column and the suspected row comprises:
adding a first preset value to a row number where the suspected row is located to obtain a first target row number;
subtracting a second preset value from a row number where the suspected row is located to obtain a second target row number;
adding a third preset value to a column number where the suspected column is located to obtain a first target column number;
subtracting a fourth preset value from a column number where the suspected column is located to obtain a second target column number; and
determining a region surrounded by the first target row number, the second target row number, the first target column number and the second target column number as the suspected touch region.

2. The method according to claim 1, wherein the step of inputting the first scanning signal to each of the first touch electrodes at a same time, and receiving the first sensing signal of each of the second touch electrodes to determine the suspected column according to the first sensing signal comprises:
inputting continuous K first scanning signals to each of the first touch electrodes at a same time, and receiving K first sensing signals of each of the second touch electrodes;
converting the K first sensing signals to K first capacitance data;
for each of the second touch electrodes, if it is detected that at least S first capacitance data in the K first capacitance data are greater than or equal to a first set threshold, determining the position of the second touch electrode to be the suspected column;
wherein, K is greater than or equal to S, and S is a positive integer greater than 1.

3. The method according to claim 1, wherein the step of inputting the second scanning signal to each of the second touch electrodes at a same time, and receiving the second sensing signal of each of the first touch electrodes to determine the suspected row according to the second sensing signal comprises:
inputting continuous K second scanning signals to each of the second touch electrodes at a same time, and receiving K second sensing signals of each of the first touch electrodes;
converting the K second sensing signals to K second capacitance data;
for each of the first touch electrodes, if it is detected that at least S second capacitance data in the K second capacitance data are greater than or equal to a second set threshold, determining the position of the second touch electrode to be the suspected row;
wherein, K is greater than or equal to S, and S is a positive integer greater than 1.

4. The method according to claim 1, wherein the first touch electrode is a touch driving electrode, and the second touch electrode is a touch sensing electrode.

5. The method according to claim 1, wherein the first scanning signal, the second scanning signal and the third scanning signal are square wave signals or sine wave signals.

6. A computing and processing device, wherein the computing and processing device comprises:
   a memory, wherein the memory stores a computer readable code; and
   one or more processors, when the computer readable code is executed by one or more processors, the computing and processing device executes the touch panel driving method according to claim 1.

7. A touch panel driving method, wherein, the touch panel comprises a plurality of first touch electrodes distributed along a row direction and a plurality of second touch electrodes distributed along a column direction, and the method comprises:
   inputting a first scanning signal to each of the first touch electrodes at a same time, and receiving a first sensing signal of each of the second touch electrodes to determine a suspected column according to the first sensing signal;
   inputting a second scanning signal to each of the second touch electrodes at a same time, and receiving a second sensing signal of each of the first touch electrodes to determine a suspected row according to the second sensing signal;
   determining a suspected touch region according to the suspected column and the suspected row; and
   sequentially inputting a third scanning signal row by row to each of the first touch electrodes in the suspected touch region, and receiving a third sensing signal of each of the second touch electrodes in the suspected touch region to determine a touch position according to the third sensing signal;
   wherein when the suspected row is multiple suspected rows and the suspected column is multiple suspected columns, the step of determining the suspected touch region according to the suspected column and the suspected row comprises:
   determining a maximum value and a minimum value of row numbers where a plurality of suspected rows are located as a maximum suspected row number and a minimum suspected row number, respectively;
   determining a maximum value and a minimum value of column numbers where a plurality of suspected columns are located as a maximum suspected column number and a minimum suspected column number, respectively;
   adding a first preset value to the maximum suspected row number to obtain a first target row number;
   subtracting a second preset value from the minimum suspected row number to obtain a second target row number;
   adding a third preset value to the maximum suspected column number to obtain a first target column number;
   subtracting a fourth preset value from the minimum suspected column number to obtain a second target column number; and
   determining a region surrounded by the first target row number, the second target row number, the first target column number and the second target column number as the suspected touch region.

8. A touch display device, wherein the touch display device comprises a touch panel and a touch panel driving apparatus configured for executing the operations comprising:
   inputting a first scanning signal to each of the first touch electrodes at a same time, and receiving a first sensing signal of each of the second touch electrodes to determine a suspected column according to the first sensing signal;
   inputting a second scanning signal to each of the second touch electrodes at a same time, and receiving a second sensing signal of each of the first touch electrodes to determine a suspected row according to the second sensing signal;
   determining a suspected touch region according to the suspected column and the suspected row; and
   sequentially inputting a third scanning signal row by row to each of the first touch electrodes in the suspected touch region, and receiving a third sensing signal of each of the second touch electrodes in the suspected touch region to determine a touch position according to the third sensing signal;
   wherein when the suspected row is one suspected row and the suspected column is one suspected column, the operation of determining the suspected touch region according to the suspected column and the suspected row comprises:
   adding a first preset value to a row number where the suspected row is located to obtain a first target row number;
   subtracting a second preset value from a row number where the suspected row is located to obtain a second target row number;
   adding a third preset value to a column number where the suspected column is located to obtain a first target column number;
   subtracting a fourth preset value from a column number where the suspected column is located to obtain a second target column number; and
   determining a region surrounded by the first target row number, the second target row number, the first target column number and the second target column number as the suspected touch region.

9. The touch display device according to claim 8, wherein, the touch panel driving apparatus is a touch driving chip; and
   the touch display device further comprises: a system board connected to the touch driving chip, a timer control register connected to the system board, a source driving chip and a grid driving chip connected to the timer control register, and a display panel connected to the source driving chip and the grid driving chip.

10. The touch display device according to claim 8, wherein when the suspected row is multiple suspected rows and the suspected column is multiple suspected columns, the operation of determining the suspected touch region according to the suspected column and the suspected row comprises:
   determining a maximum value and a minimum value of row numbers where a plurality of suspected rows are located as a maximum suspected row number and a minimum suspected row number, respectively;
   determining a maximum value and a minimum value of column numbers where a plurality of suspected columns are located as a maximum suspected column number and a minimum suspected column number, respectively;

adding a first preset value to the maximum suspected row number to obtain a first target row number;

subtracting a second preset value from the minimum suspected row number to obtain a second target row number;

adding a third preset value to the maximum suspected column number to obtain a first target column number;

subtracting a fourth preset value from the minimum suspected column number to obtain a second target column number; and determining a region surrounded by the first target row number, the second target row number, the first target column number and the second target column number as the suspected touch region.

11. The touch display device according to claim 8, wherein the operation of inputting the first scanning signal to each of the first touch electrodes at a same time, and receiving the first sensing signal of each of the second touch electrodes to determine the suspected column according to the first sensing signal comprises:

inputting continuous K first scanning signals to each of the first touch electrodes at a same time, and receiving K first sensing signals of each of the second touch electrodes;

converting the K first sensing signals to K first capacitance data;

for each of the second touch electrodes, if it is detected that at least S first capacitance data in the K first capacitance data are greater than or equal to a first set threshold, determining the position of the second touch electrode to be the suspected column;

wherein, K is greater than or equal to S, and S is a positive integer greater than 1.

12. The touch display device according to claim 8, wherein the operation of inputting the second scanning signal to each of the second touch electrodes at a same time, and receiving the second sensing signal of each of the first touch electrodes to determine the suspected row according to the second sensing signal comprises:

inputting continuous K second scanning signals to each of the second touch electrodes at a same time, and receiving K second sensing signals of each of the first touch electrodes;

converting the K second sensing signals to K second capacitance data;

for each of the first touch electrodes, if it is detected that at least S second capacitance data in the K second capacitance data are greater than or equal to a second set threshold, determining the position of the second touch electrode to be the suspected row;

wherein, K is greater than or equal to S, and S is a positive integer greater than 1.

* * * * *